United States Patent
Meyer et al.

(10) Patent No.: US 9,998,051 B2
(45) Date of Patent: Jun. 12, 2018

(54) METHOD FOR THE REDUCTION AND MODULATION OF NOISE OF AN ELECTRIC MOTOR

(71) Applicants: ThyssenKrupp Presta AG, Eschen (LI); Hochschule München, München (DE); ThyssenKrupp AG, Essen (DE)

(72) Inventors: Martin Meyer, St. Gallen (CH); Stefan Sentpali, Pfaffenhofen (DE)

(73) Assignees: ThyssenKrupp Presta AG, Eschen (LI); Hochschule München, München (DE); ThyssenKrupp AG, Essen (DE)

(*) Notice: Subject to any disclaimer, the term of this patent is extended or adjusted under 35 U.S.C. 154(b) by 0 days. days.

(21) Appl. No.: 15/313,344

(22) PCT Filed: Apr. 21, 2015

(86) PCT No.: PCT/EP2015/058569
§ 371 (c)(1),
(2) Date: Nov. 22, 2016

(87) PCT Pub. No.: WO2015/176895
PCT Pub. Date: Nov. 26, 2015

(65) Prior Publication Data
US 2017/0187313 A1 Jun. 29, 2017

(30) Foreign Application Priority Data
May 23, 2014 (DE) .................. 10 2014 007 502

(51) Int. Cl.
*H02P 6/06* (2006.01)
*G01M 17/00* (2006.01)
(Continued)

(52) U.S. Cl.
CPC ............ *H02P 21/50* (2016.02); *B62D 5/0463* (2013.01); *H02P 27/08* (2013.01); *B62D 5/0472* (2013.01)

(58) Field of Classification Search
None
See application file for complete search history.

(56) References Cited

U.S. PATENT DOCUMENTS 9,056,626 B2 * 6/2015 Imamura .............. B62D 5/0472
9,143,081 B2 * 9/2015 Gebregergis ........... B62D 5/046

FOREIGN PATENT DOCUMENTS

DE 102005014499 A1 11/2005
DE 102009046166 A1 7/2010
(Continued)

OTHER PUBLICATIONS

Written Opinion dated Jul. 1, 2015 in Int'l Application No. PCT/EP2015/058569 (English Translation).
Int'l Search Report dated Jul. 1, 2015 in Int'l Application No. PCT/EP2015/058569.
Written Opinion dated Jul. 1, 2015 in Int'l Application No. PCT/EP2015/058569 (German).
(Continued)

*Primary Examiner* — Bentsu Ro
*Assistant Examiner* — Zemenay Truneh
(74) *Attorney, Agent, or Firm* — Panitch Schwarze Belisario & Nadel LLP

(57) ABSTRACT

A method for the noise modulation of a three-phase synchronous electric motor driven using a vector regulation by means of a motor control unit. Actual values for the rotated current components $i_d$ and $i_q$ may be obtained in an open-loop control system, where $i_d$ corresponds to the magnetization current and $i_q$ corresponds to the torque-forming current of the synchronous motor. The actual values may be compared with predetermined reference target values, and the differences between the actual values and the reference target values may be converted into control variables to regulate the actual values ($i_q$, $i_d$) to the reference target
(Continued)

Figure 1:
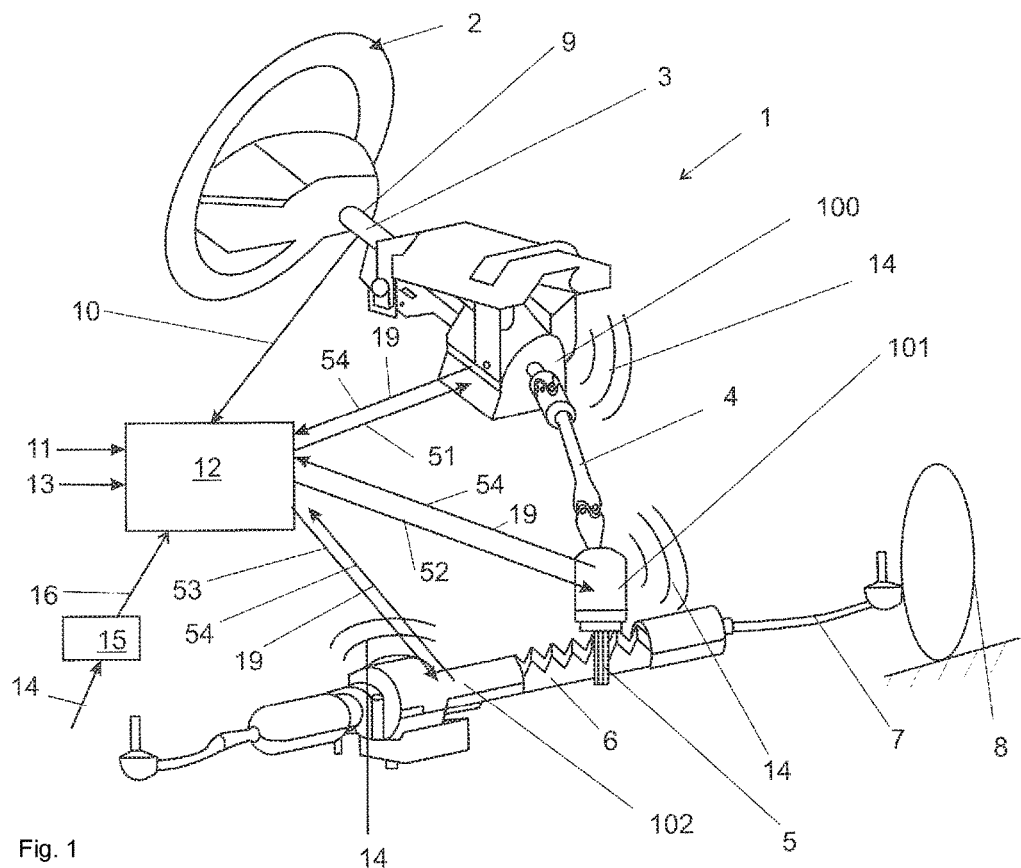

values. The magnetization current-forming current component ($i_d$) may be adapted using an acoustic controller to a desired acoustic state depending on an acoustic state that was measured by a measuring device and was transmitted to the motor control unit.

7 Claims, 1 Drawing Sheet

(51) Int. Cl.
*H02P 21/00* (2016.01)
*B62D 5/04* (2006.01)
*H02P 27/08* (2006.01)

(56) References Cited

FOREIGN PATENT DOCUMENTS

| | | |
|---|---|---|
| DE | 102010049359 A1 | 5/2011 |
| DE | 102011004384 A1 | 8/2012 |
| DE | 102012211689 A1 | 1/2014 |
| JP | H 04200294 A | 7/1992 |
| WO | 2014177144 A2 | 11/2014 |

OTHER PUBLICATIONS

Office Action dated Jul. 24, 2014 in DE Application No. 10-2014-007502.8.

\* cited by examiner

METHOD FOR THE REDUCTION AND MODULATION OF NOISE OF AN ELECTRIC MOTOR

This application is a Section 371 U.S. National Stage Filing of International Application No, PCT/EP2015/058569, filed Apr. 21, 2015, which was published in the German language on Nov. 26, 2015, under International Publication No. WO 2015/176895 A1, which claims priority to German Application No. 10 2014 007 502.8, filed May 23, 2014, the contents of which are incorporated by reference herein.

The present invention relates to a method for noise modulation of an electric motor.

Within the meaning of the invention the term "noise" includes, in addition to audible noises, also noises that can be perceived as vibrations.

Electric motors are used for example in power assisted steering or superimposed steering systems of motor vehicles in order to assist a manual movement of the steering wheel initiated by a driver or to impose a further steering angle. With electromechanical steering systems the electric motor assists and superimposes the steering movement of the driver on the steering column or the steering box.

In operation an electromechanical steering system generates, for example when executing steering movements when the vehicle is stationary, acoustic emissions that are attributed to the electric motor. The radial magnetic field components of the electric motor lead to a cyclical deformation of the motor, which causes an acoustic radiation.

In modern electrical steering systems a field-oriented vector regulation (FOR) is used in order to configure precisely the positional regulation of synchronous motors. For this purpose the three-phase current system is converted with the aid of the position of the rotor of the synchronous motor, in particular the polar radial angle $\varphi$, into a complex, orthogonal rotor co-ordinate system. This gives the rotated current components d and q, where d corresponds to the magnetisation current and q corresponds to the torque-forming current of the synchronous motor. On activating the synchronous motor the torque in particular is optimised, in which the d-q target variables for the respective operating situation are optimally rated in downstream PI control stages. In this connection the current component q in particular is regulated in the form of ripple compensation in the downstream PI control stages for the vitro-acoustic optimisations of the steering system. Acoustic problems, such as the typical interfering noise of electric motors, are handled conventionally using secondary measures. Owing to the secondary measures the system is adversely affected as regards important target quantities, such as for example light-weight construction and rigidity. Also the costs and manufacturing expenditure are increased due to the additional measures.

With electrically driven vehicles there is the problem, particularly in urban traffic, that the vehicle is relatively difficult to perceive acoustically on account of the low emitted noise, which leads to an increased risk. In order to improve the perception it is possible for example to generate a warning noise when the vehicle is manoeuvring.

From DE 10 2012 211 689 A1 a method is known for generating noise, in which the power supply to the electric motor is modified so that the change in the motor shaft rotation resulting from the modification lies within a defined tolerance. How the energisation of the electric motor is exactly modulated is not disclosed.

In JPH04200294 A a modulation method for an electric motor for noise modulation is disclosed, in which the motor current is modulated with a carrier frequency that is an image of the desired noise formation. In this method it is envisaged to convert the interfering noises of the motor by a pulse width modulation into a musical interval with a melody. The disadvantage here is that the rotational speed and the torque output by the electric motor fluctuate corresponding to the registered noise.

The object of the invention is to provide a method for noise modulation of an electric motor in which the rotational speed output by the electric motor and the torque output by the electric motor are influenced only to a very slight extent.

This object may be achieved by a method as set forth in one or more of the accompanying claims.

For this, a method is provided for noise modulation of an electric motor, wherein the electric motor is a multiphase synchronous motor, which is driven using a vector regulation by means of a motor control unit, wherein actual values for the rotated current components id and iq are obtained in an open-loop control system, wherein id corresponds to the magnetisation current and iq corresponds to the torque-forming current of the synchronous motor, and wherein the actual values are compared with predetermined reference variables iq_target, id_target, wherein the differences between the actual values and the reference variables are converted via a first regulator and a first transformation stage in a duty cycle for a PWM generator into target variables, in order to regulate the actual values iq, id to the reference variables iq_target, id_target, in which the magnetisation current-forming current component id is adapted, depending on an acoustic state that was measured by a measuring device and was transmitted by means of a signal output to the motor control unit, by means of an acoustic regulator to a desired acoustic state. By means of this method for noise modulation the torque output by the electric motor is influenced only to a very small extent.

The method is preferably used three-phase synchronous motor.

Preferably a reference acoustic variable is compared in the acoustic regulator to the acoustic state corresponding to a default function, and the resulting deviation is translated into electrical variables and converted in a model/characteristic map into dq-current target variables.

With the aid of the method according to the invention for the noise modulation, on the one hand specifically desired noises can be generated and also noises produced during operation of the electric motor can be reduced. Furthermore with the use of corresponding default functions for the reference acoustic variable also specifically other noises in vehicles can be influenced. In this connection it, is also conceivable, and possible by appropriately produced phase-displaced noise emissions in the electric motor to reduce or cancel other vehicle noises, in the sense of anti-noise.

In a preferred embodiment the dq-current target variables are converted via a second controller and a second transformation stage into physical control variables, which are counter-balanced with the physical control variables of the control system after the first transformation stage.

In this connection it is advantageous if the acoustic variables are converted in the acoustic regulator into a higher-value dimension.

Preferably the motor is part of a vehicle and/or part of a power assisted steering system.

Preferably the method according to the invention for noise modulation is used as a method for noise reduction in a vehicle, in which a threshold value is determined with a sensing technology and from this a phase-displaced reference acoustic variable is calculated, which is used as reference value for the previously implemented method for the noise modulation of the electric motor.

Figure 2:
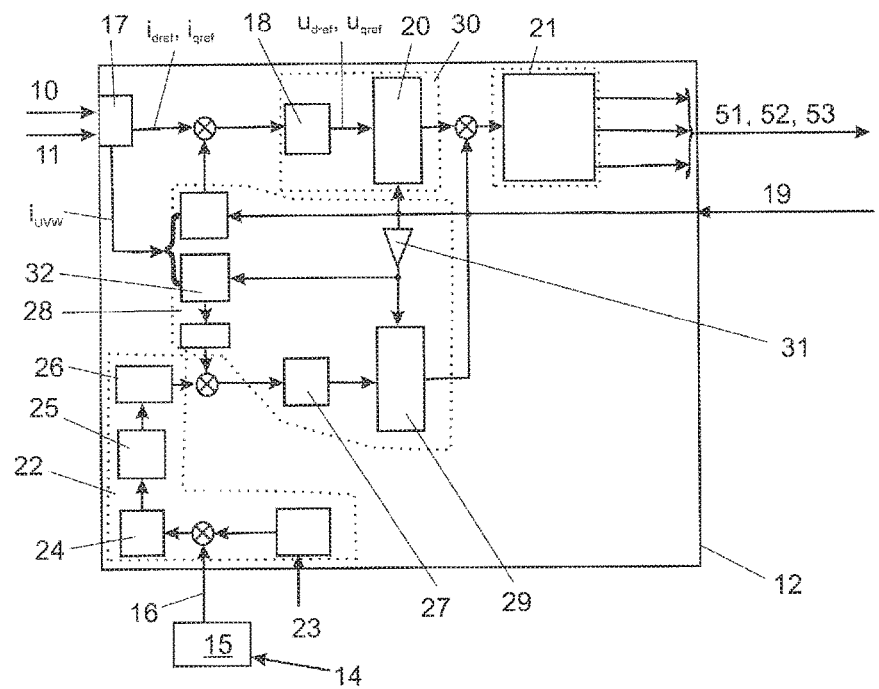

An embodiment of the invention is described in more detail hereinafter with the aid of the drawings, in which:

FIG. 1: is a schematic view of an electric power assisted steering system, and also FIG. 2: is a control loop of a motor control unit.

FIG. 1 shows an electrical power assisted steering system 1 for a vehicle with a steering wheel 2, which is coupled in a torque-proof manner to an upper steering shaft 3 and a lower steering shaft 4. The lower steering shaft 4 is in turn coupled in a torque-proof manner to a steering pinion 5. The steering pinion 5 engages in a known manner with a toothed segment of a steering rack 6. The steering rack 6 is displaceably mounted in the direction of its longitudinal axis in a steering housing. At its free end the steering rack 6 is connected to steering track rods 7. The track rods 7 themselves are connected in a known manner via steering knuckles to in each case a steered wheel 8 of the vehicle. A rotation of the steering wheel 2 results via the connection of the steering shaft 3, 4 and steering pinion 5 in a longitudinal displacement of the steering rack 6 and thus to a turning movement of the steered wheels 8. The steered wheels 8 experience on a road surface a feedback effect, which counteracts the steering movement. A force is consequently required to turn the wheels 8, which requires a corresponding torque on the steering wheel 2. A servo motor of a servo system 100, 101, 102 is provided in order to assist the driver in this steering movement. The servo device 100, 101, 102 can in this connection be arranged as a superimposed steering system on the steering column 100 or as an auxiliary force assistance device on the pinion 101 or the steering rack 102. A torsion sensor 9 is provided on the steering shaft, which detects a steering torque 10. This steering torque 10 is transmitted with further input variables 11, such as for example the vehicle speed and measurement signals 54 from the electric motor, such as for example the instantaneous rotor position 19 and/or measured current values in the phase coils, to a motor control unit 12, which determines from this with the aid of a default function 13 reference variables or a target current for energising the servo motor. The finally calculated control variables or current values 51, 52, 53 are transmitted to the servo device 100, 101, 102 and correspondingly drive the electric motor. The noises 14 generated by the electric motor are measured in a measuring device 15 and transmitted by means of a signal output 16 to the motor control unit 12.

The noise modulation according to the invention of the electric motor is clarified in FIG. 2.

On the basis of the measured steering torque 10, further input variables 11 and a default function 13, a dq-target current $i_{dref}$, $i_{qref}$ and a three-phase target current $i_{uvw}$ are determined in a first device 17 of the motor control unit 12. The known steering regulation takes place in a control device 30. In the example a PI regulator 18, the so-called steering regulator, regulates the dq-target voltages $u_{dref}$, $u_{qref}$ according to these dq-target variables $i_{dref}$, $i_{qref}$ and the dq-state variables $i_d$, $i_q$, which were determined by means of a rotor position 19 and the three-phase target current $i_{uvw}$. Then with the aid of the rotor angle θ an inverse transformation 20 is performed in order to transfer the voltage command values from the co-rotating co-ordinate system into a stationary co-ordinate system. In a device 21 the voltage command values are converted into electrical quantities. In this, the phase currents of the three motor phases U, V, W are generated according to the voltage command values, in which in the inverter MosFET switches are switched in specific patterns by a pulse-width modulation control. The phase currents 51, 52, 53 are transmitted to the servo device 100, 101, 102 for the control. They have the appropriate value for a desired power steering.

A device 22 first of all checks the acoustic state that was measured by the measuring device 15 and was transmitted by means of the signal output 16 to the motor control unit 12. In this connection a reference acoustic variable is compared to the actual value of the signal input corresponding to a default function 23. The resulting deviation is converted via an NVH controller 24 and a co-ordinate transformation 25 into electrical, higher harmonic quantities and converted in a model/characteristic map 26 into dq-current target quantities, which are transformed again via a PI regulator 27 in a device 28 into physical control variables, in order to bypass the low-pass behaviour of the PI controller 27 in the device 28, the actual variables and the target variables are converted in a higher-order dimension, corresponding to the acoustic problem, for example of an n-th motor order corresponding to an n-th harmonic of the motor rotational speed. The regulation therefore no longer relates to the rotation co-ordinates, but to a multiple thereof, whereby the regulation frequency is artificially reduced.

In the device 28, which can be regarded as a by-pass for the steering controller 18, electrically higher-harmonic reference values are also used as target variable. For this purpose the state variables of the electric motor are first of all raised to a higher-value state (harmonic range) in the transformer 31. After renewed co-ordinate transformation in the transformer 32 a comparison is made with the current target variables $i_{dref}n_{th}$, $i_{qref}n_{th}$ that were supplied from the device 22. The following PI controller 27 regulates the voltages that in turn then have to be converted back. After this inverse transformation 29 the voltages after the device 20 are fed into the control system and thereby the voltage command values are matched before the generation of the phase currents to the desired acoustic state.

As illustrated in FIG. 2, the reference value of the d portion can be variably adjusted. In this way the radial portion of the field vector can be substantially arbitrarily stimulated, which leads to a reduction of existing vibrations and sound emissions, for example by generating a counter-phase sound emission, or to the free generation of sound emissions.

The upstream devices 22 and 28 are termed acoustic controllers. The acoustic controller operates on a model or characteristic map basis. It is able to detect vibrational-acoustic interference variables that come from the steering or are transmitted via the steering, and convert them into a reference variable that corrects the interference variable or generates a desired excitation. The acoustic controller is arranged together with the devices 17, 18, 20 and 21 on the motor control unit 12.

The d- and q-portions can in each case be altered independently of one another. However, the variables are physically coupled to one another on account of the inductivity of the electric motor. Accordingly effects of the upstream acoustic controller on the steering behaviour due to tangential force components in the motor must be prevented. This can be accomplished for example by utilising the damping and elasticity in the steering rod. For this, a minimum frequency of the regulation must be maintained however. In order to ensure this minimum frequency of the regulation, the acoustic controller need not be connected upstream of the steering controller since this has a low-pass behaviour.

For this reason the acoustic control variable is first of all regulated separately and is then converted after the steering controller with the voltage command variables into rotation co-ordinates.

The method according to the invention can be used for the active compensation of electric motor interference noises in the steering system, for the active compensation of vibrations generated by the road surface and transmitted via the steering rod, for generating signals for driver assistance systems, and for the active and authentic creation of a driving noise for electric vehicles.

An operating point-dependent phase regulation is used in order to generate directly at the source an excitation having a defined phase relationship with the interfering variable. In this connection the hardware (motor, motor control unit) as well as the software of conventional steering systems can be, used unaltered. Additional act asters active measures and complicated secondary measures are not necessary.

We claim:

1. A method for noise modulation of an electric motor, wherein the electric motor is a multiphase synchronous motor driven by means of a motor control unit using a vector regulation, the method including:
    obtaining actual values for rotated current components id and iq in an open-loop control system, wherein id corresponds to a magnetisation current and iq corresponds to a torque-forming current of the synchronous motor;
    comparing the actual values with predetermined reference variables;
    converting, in a duty cycle for a pulse-width modulation (PWM) generator, via a first controller and a first transformation stage, differences between the actual values and the reference variables into control variables in order to regulate the actual values (iq, id) to the reference,
    wherein the magnetisation current-forming current component (id) is adapted by means of an acoustic controller to a desired acoustic state depending on an acoustic state that was measured by a measuring device and was transmitted by means of a signal output to the motor control unit, wherein, in the acoustic controller, a reference acoustic variable is compared with the acoustic state corresponding to a default function, and a resulting deviation is translated into electrical variables and is converted in a model/characteristic field into dq-current target variables.

2. The method for noise modulation according to claim 1, wherein the electric motor is a three-phase synchronous motor.

3. The method for noise modulation of an electric motor according to claim 1, wherein the electric motor is part of a vehicle.

4. The method for noise modulation of an electric motor according to claim 1, wherein the electric motor is part of a power assisted steering system.

5. A method for noise reduction in a vehicle, the method including:
    determining a threshold value using a sensor technology system;
    calculating a phase-displaced reference acoustic variable based on the threshold; and
    using the phase-displaced reference acoustic variable as a reference value for the method for noise modulation of the electric motor corresponding to claim 1.

6. A method for noise modulation of an electric motor, wherein the electric motor is a multiphase synchronous motor driven by means of a motor control unit using a vector regulation, the method including:
    obtaining actual values for rotated current components id and iq in an open-loop control system, wherein id corresponds to a magnetisation current and iq corresponds to a torque-forming current of the synchronous motor;
    comparing the actual values with predetermined reference variables;
    converting, in a duty cycle for a pulse-width modulation (PWM) generator, via a first controller and a first transformation stage, differences between the actual values and the reference variables into control variables in order to regulate the actual values (iq, id) to the reference,
    wherein the magnetisation current-forming current component (id) is adapted by means of an acoustic controller to a desired acoustic state depending on an acoustic state that was measured by a measuring device and was transmitted by means of a signal output to the motor control unit, wherein the dq-current target variables are converted via a second controller and a second transformation stage into physical control variables that are corrected with the physical control variables of the open-loop control system after the first transformation stage.

7. A method for noise modulation of an electric motor, wherein the electric motor is a multiphase synchronous motor driven by means of a motor control unit using a vector regulation, the method including:
    obtaining actual values for rotated current components id and iq in an open-loop control system, wherein id corresponds to a magnetisation current and iq corresponds to a torque-forming current of the synchronous motor;
    comparing the actual values with predetermined reference variables;
    converting, in a duty cycle for a pulse-width modulation (PWM) generator, via a first controller and a first transformation stage, differences between the actual values and the reference variables into control variables in order to regulate the actual values (iq, id) to the reference,
    wherein the magnetisation current-forming current component (id) is adapted by means of an acoustic controller to a desired acoustic state depending on an acoustic state that was measured by a measuring device and was transmitted by means of a signal output to the motor control unit, wherein at least one acoustic variable is converted in the acoustic controller into a higher-order dimension.

* * * * *